United States Patent
Adlersberg et al.

(10) Patent No.: US 11,334,618 B1
(45) Date of Patent: May 17, 2022

(54) DEVICE, SYSTEM, AND METHOD OF CAPTURING THE MOMENT IN AUDIO DISCUSSIONS AND RECORDINGS

(71) Applicant: AudioCodes Ltd., Lod (IL)

(72) Inventors: Shabtai Adlersberg, Ra'anana (IL); Menachem Honig, Metar (IL); Nimrod Borovsky, Ramat HaSharon (IL)

(73) Assignee: AUDIOCODES LTD., Lod (IL)

( * ) Notice: Subject to any disclaimer, the term of this patent is extended or adjusted under 35 U.S.C. 154(b) by 0 days.

(21) Appl. No.: 17/099,830

(22) Filed: Nov. 17, 2020

(51) Int. Cl.
*G06F 16/638* (2019.01)
*G06F 3/16* (2006.01)
*G06F 3/0488* (2022.01)
*G06F 16/64* (2019.01)

(52) U.S. Cl.
CPC .......... *G06F 16/638* (2019.01); *G06F 3/0488* (2013.01); *G06F 3/162* (2013.01); *G06F 16/64* (2019.01)

(58) Field of Classification Search
CPC ...... G06F 16/638; G06F 16/64; G06F 3/0488; G06F 3/162; G06F 3/165
See application file for complete search history.

(56) References Cited

U.S. PATENT DOCUMENTS

| | | | |
|---|---|---|---|
| 2012/0321062 A1* | 12/2012 | Fitzsimmons | H04M 3/56 379/202.01 |
| 2015/0181020 A1* | 6/2015 | Fitzsimmons | H04M 3/42221 379/67.1 |
| 2016/0328105 A1* | 11/2016 | Chandra | G06F 3/0488 |
| 2020/0292823 A1* | 9/2020 | Niforatos | G06F 40/30 |

* cited by examiner

*Primary Examiner* — Fan S Tsang
*Assistant Examiner* — David Siegel
(74) *Attorney, Agent, or Firm* — Eitan Mehulal Sadot

(57) ABSTRACT

Devices, systems, and methods of Capturing the Moment in audio discussions and recordings. A user utilizes an electronic device to record audio, or to participate in an audio conversation or an audio/video conversation. During the conversation, the user clicks on presses a button to create an audio bookmark at desired time-points. Later, the system generates separate a short audio-clip for a few sentences that were spoken before and after each such audio bookmarks. The system further generates an aggregated clip or summary of the bookmarked segments, as well as textual transcription of the bookmarked content.

16 Claims, 7 Drawing Sheets

---

During an ongoing audio conversation, receiving from an electronic device of a participant, a tactile input via a touch-screen of the electronic device or via a physical input unit of the electronic device, of an audio bookmarking command that indicates a request of said participant to create an audio bookmark; this step is performed in real time while recording said audio conversation.   211

↓

Determining a time-point within said audio conversation, at which said tactile input was received.   212

↓

Automatically generating for said participant a user-specific set of audio bookmarks for a recorded version of said audio conversation; each audio bookmark in the set of audio bookmarks, points at a particular time-point within the recorded version of said audio conversation in which said participant provided an audio bookmarking command.   213

↓

Associating between (I) each audio bookmark created by said participant, and (II) a descriptor of a speaker who spoke during a time-slot of said audio bookmark and that was recognized automatically by a speaker recognition unit; and enabling said participant to search or to browse audio bookmarks based on a speaker descriptor.   214

| During an ongoing audio conversation, receiving from an electronic device of a participant, a tactile input via a touch-screen of the electronic device or via a physical input unit of the electronic device, of an audio bookmarking command that indicates a request of said participant to create an audio bookmark; this step is performed in real time while recording said audio conversation. 211 |

| Determining a time-point within said audio conversation, at which said tactile input was received. 212 |

| Automatically generating for said participant a user-specific set of audio bookmarks for a recorded version of said audio conversation; each audio bookmark in the set of audio bookmarks, points at a particular time-point within the recorded version of said audio conversation in which said participant provided an audio bookmarking command. 213 |

| Associating between (I) each audio bookmark created by said participant, and (II) a descriptor of a speaker who spoke during a time-slot of said audio bookmark and that was recognized automatically by a speaker recognition unit; and enabling said participant to search or to browse audio bookmarks based on a speaker descriptor. 214 |

Fig. 2A

During an ongoing audio conversation, receiving from an electronic device of a participant, a tactile input via a touch-screen of the electronic device or via a physical input unit of the electronic device, of an audio bookmarking command that indicates a request of said participant to create an audio bookmark; this step is performed in real time while recording said audio conversation. 221

Determining a time-point within said audio conversation, at which said tactile input was received. 222

Automatically generating for said participant a user-specific set of audio bookmarks for a recorded version of said audio conversation; each audio bookmark in the set of audio bookmarks, points at a particular time-point within the recorded version of said audio conversation in which said participant provided an audio bookmarking command. 223

For a set of N audio bookmarks of said participant, automatically generating a set of N separate audio-clips, each one including a time-constrained portion of the recorded version of the audio conversation that includes audio that was captured surrounding a time-point of a single audio bookmark; and based on a textual input received from said participant, assigning a particular name or a particular tag to a particular audio-clip of said N separate automatically-generated audio-clips. 224

Fig. 2B

During an ongoing audio conversation, receiving from an electronic device of a participant, a tactile input via a touch-screen of the electronic device or via a physical input unit of the electronic device, of an audio bookmarking command that indicates a request of said participant to create an audio bookmark; this step is performed in real time while recording said audio conversation. 231

Determining a time-point within said audio conversation, at which said tactile input was received. 232

Automatically generating for said participant a user-specific set of audio bookmarks for a recorded version of said audio conversation; each audio bookmark in the set of audio bookmarks, points at a particular time-point within the recorded version of said audio conversation in which said participant provided an audio bookmarking command. 233

Automatically generating for said participant an audio trailer of said audio conversation, by aggregating audio-segments of the audio-conversation, each audio-segment corresponding to a time-slot of the audio conversation that surrounds the time-point of the audio bookmark; the audio trailer is provided to said participant as at least one of: (i) an audio clip for downloading or sharing, (ii) a textual transcript. 234

Fig. 2C

During an ongoing audio conversation, receiving from an electronic device of a participant, a tactile input via a touch-screen of the electronic device or via a physical input unit of the electronic device, of an audio bookmarking command that indicates a request of said participant to create an audio bookmark; this step is performed in real time while recording said audio conversation. 241

Determining a time-point within said audio conversation, at which said tactile input was received. 242

Automatically generating for said participant a user-specific set of audio bookmarks for a recorded version of said audio conversation; each audio bookmark in the set of audio bookmarks, points at a particular time-point within the recorded version of said audio conversation in which said participant provided an audio bookmarking command. 243

Automatically generating for said participant, a selective audio trailer of the audio conversation that is based on a particular speaker, by aggregating audio-segments of the audio-conversation in which a speaker recognition unit had recognized said particular speaker; each audio-segment corresponding to a time-slot of the audio conversation that surrounds the time-point of the audio bookmark; the selective audio trailer is provided to said participant as at least one of: (i) an audio clip for downloading or sharing, (ii) a textual transcript. 244

Fig. 2D

```
┌─────────────────────────────────────────────────────────────┐
│ During an ongoing audio conversation, receiving from an electronic │
│ device of a participant, a tactile input via a touch-screen of the │
│ electronic device or via a physical input unit of the electronic device, │
│ of an audio bookmarking command that indicates a request of said │
│ participant to create an audio bookmark; this step is performed in real │
│ time while recording said audio conversation.           251 │
└─────────────────────────────────────────────────────────────┘
                              │
                              ▼
┌─────────────────────────────────────────────────────────────┐
│ Determining a time-point within said audio conversation, at which │
│ said tactile input was received.                        252 │
└─────────────────────────────────────────────────────────────┘
                              │
                              ▼
┌─────────────────────────────────────────────────────────────┐
│ Automatically generating for said participant a user-specific set of │
│ audio bookmarks for a recorded version of said audio conversation; │
│ each audio bookmark in the set of audio bookmarks, points at a │
│ particular time-point within the recorded version of said audio │
│ conversation in which said participant provided an audio │
│ bookmarking command.                                    253 │
└─────────────────────────────────────────────────────────────┘
                              │
                              ▼
┌─────────────────────────────────────────────────────────────┐
│ Receiving from said participant, while said audio conversation is │
│ ongoing, an extension command to extend a time-slot that will be │
│ associated with a recently-commanded audio bookmark; and in │
│ response to said extension command, extending a time-length of the │
│ time-slot that is associated with the recently-commanded audio │
│ bookmark.                                               254 │
└─────────────────────────────────────────────────────────────┘
```

Fig. 2E

During an ongoing audio conversation, receiving from an electronic device of a participant, a tactile input via a touch-screen of the electronic device or via a physical input unit of the electronic device, of an audio bookmarking command that indicates a request of said participant to create an audio bookmark; this step is performed in real time while recording said audio conversation. 261

Determining a time-point within said audio conversation, at which said tactile input was received. 262

Automatically generating for said participant a user-specific set of audio bookmarks for a recorded version of said audio conversation; each audio bookmark in the set of audio bookmarks, points at a particular time-point within the recorded version of said audio conversation in which said participant provided an audio bookmarking command. 263

Generating from said audio conversation, a user-specific audio summary which corresponds to audio captured at time-slots that correspond to the audio bookmarks, and further generating a user-specific textual summary which corresponds to text of the audio that was captured in said time-slots; a different user-specific audio summary, and a different user-specific textual summary, are generated and then played or displayed separately to each user based on the audio bookmarks that he created. 264

Fig. 2F

DEVICE, SYSTEM, AND METHOD OF CAPTURING THE MOMENT IN AUDIO DISCUSSIONS AND RECORDINGS

FIELD

The present invention is related to the field of audio processing.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

SUMMARY

The present invention may include, for example, systems, devices, and methods for recording, processing and/or bookmarking various types of audio streams or audio segments, such as audio or audio/video discussions, conversations, meetings, audio conferences, video conferences, or the like.

For example, a user utilizes an electronic device to record audio, or to participate in an audio conversation or an audio/video conversation. During the conversation, the user may click a designated button to mark bookmarks at desired points in time. Later, the system generates separately a short audio and/or video and/or content clip that includes a few sentences that were spoken before and after each such audio point-in-time of interest. The system generates an aggregated clip or summary of the bookmarked segments, as well as textual transcription of the bookmarked content.

The present invention may provide other and/or additional benefits or advantages.

BRIEF DESCRIPTION OF THE DRAWINGS

FIGS. 2A-2F are flow-charts demonstrating operations of methods in accordance with some embodiments of the present invention.

DETAILED DESCRIPTION OF SOME DEMONSTRATIVE EMBODIMENTS

Figure 1:
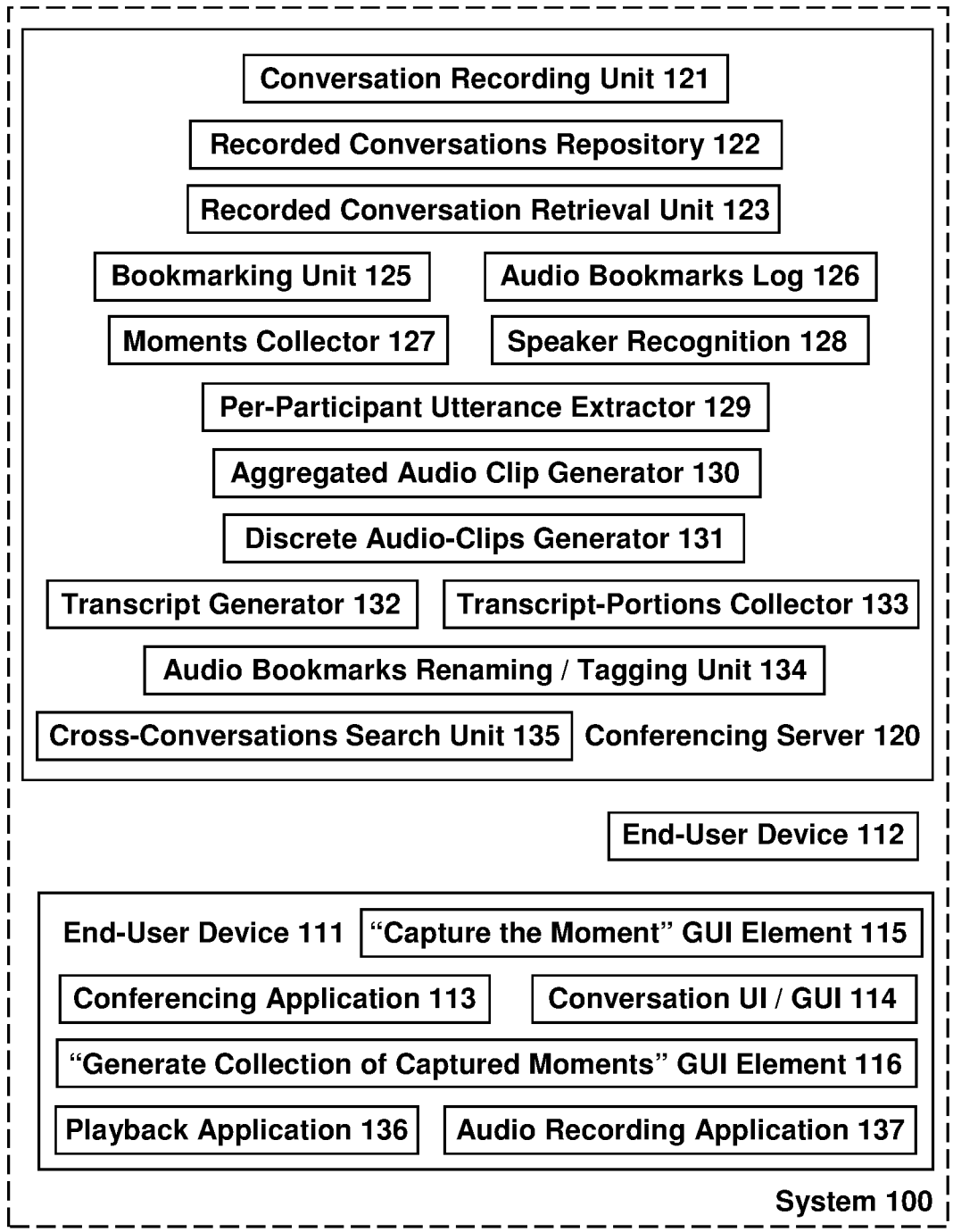
FIG. 1 is a schematic block-diagram illustration of a system, in accordance with some demonstrative embodiments of the present invention.

The Applicants have realized that a user of an electronic device, such as a computer or a smartphone, sometimes attends a lengthy audio conversation or audio/video meeting, and may wish to selectively mark or bookmark or tag particular time-points or time-slots in such lengthy conversation that are of greater interest for him, and that he would later desire to retrieve rapidly and efficiently.

Reference is made to FIG. 1, which is a schematic block-diagram illustration of a system 100, in accordance with some demonstrative embodiments of the present invention. System 100 may comprise two or more End-User Devices 111-112; for example, a first end-user device 111 operated by a first user, and a second end-user device 112 operated by a second user. Each end-user device may be, for example, a smartphone, a tablet, a laptop computer, a desktop computer, a smart-watch, or other electronic device or other communication device that enables its user to participate in an audio conversation and/or in a video conversation and/or in an audio/video conversation with one or more other users. A Conferencing Server 120 operates to establish and enable the connection between the end-user devices 111-112.

Conferencing Server 120 further comprises, or is associated with, a Conversation Recording Unit 121, which records the audio (and/or the video) of the ongoing conversation. The recorded audio is stored (e.g., as an audio file; optionally compressed and/or encoded) in a Recorded Conversations Repository 122. Furthermore, a Recorded Conversation Retrieval Unit 123 enables a user to selectively retrieve, from the Recorded Conversations Repository 122, a particular previously-recorded audio recording of a previous audio (and/or video) conference or discussion, and to listen to such recording or to user-selected segments thereof.

For each recorded audio conversation, the Conferencing Server 120 further stores in the Recorded Conversations Repository 122, or in a list or table that points to it, the relevant meta-data for each such recorded conversation; for example, date-stamp and time-stamp in which the audio recording started; names and/or usernames and/or screen-names of participants; phone numbers and/or email addresses of participants; device-type or application-type per participant (e.g., User Adam participated from his smartphone using a mobile application; User Bob participated from his laptop via a browser extension); entry time and/or exit time of participants that joined or left the conversation; or the like. Accordingly, the Recorded Conversation Retrieval Unit 123 enables a user to sort or filter or search or browser the Recorded Conversations Repository 122 based on such meta-data, in order to selectively retrieve a particular recorded conversation.

In a first demonstrative example, User Adam is utilizing his End-User Device 111 to engage in an audio conference with one or more other users; for example, with User Bob who operates his End-User Device 112. During such conversation, User Adam utilizes for this purpose a Conferencing Application 113 on his End-User Device 111; such as, a mobile "app" or mobile application, or a stand-alone application or software module, or a conferencing application that is implemented as an in-browser application (e.g., using HTML5 and JavaScript and CSS), or that is implemented as a browser plug-in or a browser extension or a browser add-on.

Conferencing Application 113 generates and utilizes an on-screen Conversation User Interface (UI)/Graphic User Interface (GUI) 114, which may include graphical components and/or textual components; for example, a "mute/unmute my microphone" button that enables User Adam to mute and unmute his own audio input that is captured by an acoustic microphone of End-User Device 111; a "leave" or "exit" or "end call" button that enables User Adam to end the conversation or to leave it; a "share screen" button that optionally enables User Adam to share his screen with other participants; a "camera on/off" or a "video on/off" button that optionally enables User Adam to add a video stream to the conversation, such as a live video stream captured by an imager or a camera of his End-User Device 111; a "chat" button or interface or panel, which enables User Adam to concurrently engage in a textual exchange of on-screen textual messages with one or more other participants, in parallel to the ongoing audio conversation; and/or other UI or GUI components or elements.

In accordance with the present invention, the Conversation UI/GUI 114 that is displayed on the screen of the End-User Device 111 during an ongoing conversation, includes a UI/GUI element which may be referred to as a "Capture the Moment" GUI element, or as a "Seize the Moment" GUI element, or as a "Capture the Moment" GUI Element 115. For example, after 5 minutes into a lengthy conversation, User Adam has just noticed that User Bob said an important sentence, that is of importance to User Adam, and that User Adam may wish to later retrieve efficiently and rapidly; and therefore, User Adam clicks (or touches, or taps) on the "Capture the Moment" GUI element 115 on the screen of his End-User Device 115. Later, after 3 more minutes into the conversation, User Adam says an important sentence that he would like to later retrieve or access efficiently; therefore, User Adam again clicks (or touches, or taps) on the "Capture the Moment" GUI element 115 on the screen of his End-User Device 115.

In response to each such click (or tap, or selection) performed by User Adam on his End-User Device 111, the System 100 creates and stores a bookmark or a pointer to the particular time-point at which the "Capture the Moment" GUI element 115 was engaged by User Adam. For example, a Bookmarking Unit 125 may be implemented as a server-side unit (e.g., as part of Conferencing Server 120) and/or as a client-side unit (e.g., as part of the Conferencing Application 113 running on the End-User Device 111).

Bookmarking Unit 125 creates and/or modifies an Audio Bookmarks Log 126, which is created separately and is updated separately for each recorded audio conversation and for each participant. For example, for a particular audio conversation that took place between Adam and Bob, the Bookmarking Unit 125 creates (and updates) a first Audio Bookmarks Log which logs the time-points in which User Adam has requested to "capture the moment" or create audio bookmarks; and, separately, the Bookmarking Unit 125 creates (and updates) a second Audio Bookmarks Log which logs the time-points in which User Bob has requested to "capture the moment" or create audio bookmarks. Each such Audio Bookmarks Log 126 stores pointers or indicators of the relevant time-points in which the relevant user has requested to "capture the moment"; it is thus a per-user, per-conversation, Audio Bookmarks Log.

In the above example, the Audio Bookmarks Log 126 of User Adam may include two audio bookmarks: a first audio bookmark which points to 5 minutes into the audio conversation; and a second bookmarks which points to 8 minutes into the audio conversation. User Bob may create, in parallel, his own audio bookmarks for that same conversation; such as, User Bob may request to "capture the moment" at other time-points during that conversation, and a separate and different Audio Bookmarks Log is created and updated for User Bob with regard to that audio conversation.

In some embodiments, each per-user Audio Bookmarks Log is stored only locally at the End-User Device of the relevant user who created those audio bookmarks. In other embodiments, each per-user Audio Bookmarks Log is stored locally at the End-User Device of the relevant user who created those audio bookmarks, and also at the Recorded Conversations Repository 122, such as, as additional meta-data file or meta-data list that accompanies the recorded audio conversation, and is only available accessible by the user who created those audio bookmarks. In some embodiments, optionally, a user may selectively share his Audio Bookmarks Log, or parts of it, with other users or participants.

Once the audio conversation has ended, User Adam may request from his End-User Device to provide him with a collection or a summary or an aggregation of all the "moments" that he selectively "captured" during the audio conversation. For example, User Adam may push or click or tap or select a "Generate Collection of Captured Moments" GUI Element 116, which in case sends a "generate collection of captured moments" command or signal to the Conferencing Server 120 or to other component of System 100, or otherwise triggers or initiates such collection.

Upon such signal or command, a Moments Collector Unit 127 operates to generate a Collection of Captured Moments based on the particular Audio Bookmarks Log 126 of that requesting user for that recorded audio conversation. For example, the Moments Collector Unit 127 obtains or retrieves the recorded audio file of that entire conversation; and then extracts from it particular audio-segments that preceded and followed each and every one of the time-points that were bookmarked by that specific user.

For example, the Moments Collector Unit 127 may extract, for each time-point, an audio segments that begins T1 seconds before the bookmark time-point (e.g., 10 or 15 seconds before it), and that ends T2 seconds after the bookmark time-point (e.g. 5 or 8 seconds after it); thereby generating an audio segment of approximately 15 or 20 seconds of the conversation that "surrounded" each such audio bookmark time-point. In some embodiments, the values of T1 and/or T2 may be hard-coded, or may be user-configurable or user-modifiable; for example, User Adam may configure that he wants his "moments" audio segments to include 30 seconds before and after each audio bookmark of his; whereas, User Bob may configure that he wants his "moments" audio segments to include 18 seconds before and 7 seconds after each audio bookmark of his.

In other embodiments, the Moments Collector Unit 127 may operate in association with a Speaker Recognition Unit 128, which identifies or recognizes which participant has spoken at each particular time or time-period or time-slot during the conversation. For example, the Speaker Recognition Unit 128 may keep track of each speaker in real-time as he utters speech during the conversation itself (e.g., while the audio is also being recorded), based on the source of the audio stream of each participant; such as, by logging that User Bob has spoken from 14:30 to 14:35 (in format MM:SS) since it was the audio stream that was incoming from his Smartphone that generated the audio that can be heard during that time-slot. In other embodiments, optionally, the Speaker Recognition Unit 128 may utilize other methods of speaker identification, in order to correlate between a particular audio time-slot and its respective speaker; for example, based on an audio signature or an audio profile that is pre-constructed for each participant, or based on gender recognition or gender identification (e.g., identifying that the speaker at 12:48 is a female speaker, and correlating it with User Janet who is the only female participant in this conversation, based on user names or participant names and their correlation with genders); or based on other Speaker Identification algorithms or Speaker Recognition algorithms.

Accordingly, the Moments Collector Unit 127 may perform the following operations, for each of the Audio Bookmarks of a particular Audio Bookmarks Log 126: (i) obtain from the Speaker Recognition Unit 128 an indication of the identity of the particular participant, who was talking at the time-point of the audio bookmark; (ii) obtain from the Speaker Recognition Unit 128, the exact time-point T1 in which that particular participant has started speaking, and the exact time-point T2 in which he stopped speaking; (iii) extract from the recorded audio conversation, an audio segment that is from time-point T1 to time-point T2; thereby including the entire utterance that this particular participant has said, and during which User Adam has commanded to "capture the moment". In some embodiments, the above operations may be performed by a sub-unit, such as a Per-Participant Utterance Extractor Unit 129, which may be part of the Moments Collector Unit 127 or may be operably associated therewith. In some embodiments, optionally, the Per-Participant Utterance Extractor Unit 129 may be configured by the system, or by each user, to have a time-limit (e.g., up to 60 seconds) for each extracted audio segment; in order to avoid a situation in which, for example, User Bob has spoken without interruption for 12 minutes, and User Adam captured the moment in the middle of that speech; and in such situation, only a particular time-slot (e.g., 60 seconds length) that surrounds that time-point would be extracted, rather than extracting the entire 12 minutes.

In some embodiments, the Per-Participant Utterance Extractor Unit 129, and/or other suitable unit(s) or component(s) of the system, may optionally operate to extend or to increase or to contract or to shorten or to decrease or to otherwise modify or adjust, the time-length of a time-slot that surrounds an audio bookmark, from which audio and/or video and/or text are extracted or isolated; and/or to move or adjust or to postpone or to delay a commencing time-point that precedes the marked audio bookmark; and/or to move or adjust or to postpone or to delay an ending time-point that precedes the marked audio bookmark; for example, performing such modifications or adjustments of time-slot boundaries automatically (e.g., based on analysis of the audio and determination of silence periods or silence gaps, and/or based on detecting a change in the current speaker), and/or performing such modifications based on user input. For example, User Adam is interested in shorter time-slots of extracted content; and therefore, he may configure the system that for each of his audio bookmarks, the time-slot of extracted audio should commence 5 seconds before the audio bookmark and should end 5 seconds after the audio bookmark. In contrast, User Bob is interested in longer time-slots of extracted content; and therefore, he may configure the system that for each of his audio bookmarks, the time-slot of extracted audio should commence 14 seconds before the audio bookmark and should end 12 seconds after the audio bookmark. The system may thus enable each user to configure the length of time-slots, that surround each audio bookmark of the user, from which text and/or audio and/or video are extracted for the purpose of summarizing the conversation and/or generating discrete clips. Additionally or alternatively, such adjustment or modification of time-slot boundaries may be performed automatically or autonomously by the system, based on detection of the active speaker; for example, User Adam has marked an audio bookmark at time-point T1; the system detects that at this time point, the active speaker was Participant David; the system also detects automatically that Participant David has spoken in the 4 seconds that preceded time-point T1, and in the 3 seconds that followed time-point T1; therefore, the system may automatically and/or autonomously adjust or modify the length of the time-slot that is allocated to this audio bookmark of User Adam, to include those 7 seconds (four seconds before the bookmark and three seconds after the bookmark); even though in general the system may be configured to extract time-slots of a particular length (e.g., 15 seconds before and 15 seconds after each audio bookmark), and/or even though User Adam had configured a particular set of time margins to generally apply to his own audio bookmarks (e.g., generally using 12 seconds before and 8 seconds after, for his audio bookmarks). Adjustments or modifications of the time-slots, that surround each audio bookmark, may be based on other criteria or conditions; and such time-slots may have differential time-length, such that a first audio bookmark of User Adam will be associated with a first time-length (N1 seconds) of content that surrounds it, whereas a second audio bookmark of User Adam for the same audio conversation will be associated with a second, different, time-length (N2 seconds) of content that surrounds it.

The Moments Collector Unit 127 may thus generate and collect discrete audio segments, which correlate to before-and-after utterances relative to each bookmarked time-point. In some embodiments, the Moments Collector Unit 127 may trigger an Aggregated Audio Clip Generator 130 to automatically generate a single aggregated audio clip, that includes all those bookmarked audio portions (e.g., concatenated one after the other, in sequence); thereby allowing User Adam to hear, for example, a five-minute audio segment that contains several highlights of the audio conversation that he had bookmarked, out of a lengthy 60-minute conversation that he attended.

In other embodiments, instead of (or in addition to) generating a single aggregated audio clip, the Moments Collector Unit 127 may trigger a Discrete Audio-Clips Generator 131, to generate a set of discrete or separate audio-clips or audio-files, each one of them corresponding to one of the bookmarked time-points. The list of such discrete audio clips may be shown to the requesting user (who created those audio bookmarks); and the system 100 may enable him to selectively download one, or some, or all of those short audio-clips or audio-segments, as separate audio files (e.g., as MP3 files), which he can then save or store on his device, and/or that he may selectively share with other people or send (e.g., as an attached file) to other people, or that he may post on social networks or social media websites, or may otherwise utilize.

In some embodiments, System 100 may further comprise a Transcript Generator 132, which utilizes a speech-to-text engine or an Automatic Speech Recognition (ASR) unit to generate a transcript of the entire audio conversation, or to selectively transcribe only the audio-segments that surround each of the bookmarked time-points. For example, Transcript Generator 132 may generate a transcript of the entire audio conversation; and the Moments Collector Unit 127 may then obtain from such transcript of the transcript-portion that correspond to each audio-segment that surrounds each bookmarked time-point, e.g., the transcript of the conversation that started T1 seconds before the bookmarked time-point and that ended T2 seconds after the bookmarked time-point; or, the transcript portion that corresponds to the utterance that was said, just prior to that bookmarked time-point, by the participant that is identified by the Speaker Recognition Unit 128 as the person that spoke during that time-point. The Moments Collector Unit 127 may aggregate all those transcript-portions, that correspond to pre-defined time-periods that surround each audio bookmark, and may utilize a Transcript-Portions Collector Unit 133 to generate an aggregated textual output that includes those textual portions of the transcript; and such aggregated textual item may be presented on the screen of the requesting user (who created that audio bookmarks log), or may be available for copying or for saving or downloading or sharing or posting.

In some embodiments, the user who creates the audio bookmarks, may further utilize his end-user device in order to name or tag them, using an Audio Bookmarks Renaming/Tagging Unit 134; for example, via an interface that allows him to add a meta-data item, or one or more titles or keywords or textual descriptors, to each such audio bookmark that he created, and/or to the discrete audio clips that are later presented to him for his further usage. Accordingly, for example, User Adam may name or tag his first audio bookmark with a title or a tag or a descriptor of "Bob Approved the Budget"; and he may then name or tag his second audio bookmark with a title or a tag or a descriptor of "Carl Objected to the Proposal". Such tags or titles or descriptors may be saved or stored, as meta-data or as tags or keywords or titles, in relation to each such recorded audio conversation and in relation to each user that creates his own audio bookmarks log. Furthermore, the system may further enable User Adam to browser or sort or filter or search the repository of audio recordings, based on such tags or titles or descriptors that he created; for example, User Adam may query the system for all the audio recordings in which he has created an Audio Bookmark that he named (or tagged) with "Budget"; and the system may find and fetch the audio recordings that meet such search criteria, and may further present to User Adam the particular audio-segments that correspond to the particular searched term or keyword or tag. For example, a Cross-Conversations Search Unit 135 may search multiple recorded audio conversations, and may find all those conversations in which User Adam has created an audio bookmark that he tagged with the keyword "Budget"; and may collect from those multiple audio conversations, only the audio-segments that correspond to the "Budget" related bookmarks; thereby providing to User Adam an efficient and concise list of those audio segments that pertain to "Budget" across multiple different audio recordings of different conversations. In some embodiments, the Cross-Conversations Search Unit 135 may further generate and provide to User Adam a cumulative list of the transcript-portions, that correspond to those audio-portions that he had bookmarked across multiple audio conversations, for his further utilization, saving, storing, copying, downloading, or posting.

It is noted that each participant in the audio conversation may perform his "capture the moment" audio bookmarking operations in a confidential manner or in a secretive manner, by rapidly and efficiently clicking once (per audio bookmark) on the "Capture the Moment" GUI element on the screen of his own end-user device; without having to speak or to make a voice command or a voice indication that this participant has just created this audio bookmark for his own private usage; and without other participants being aware that he created such audio bookmark; and without such audio bookmarks, their existence, and their timing, being available or accessible to other users or to other participants (unless the creating user has explicitly shared them or allowed access to them).

In another demonstrative set of embodiments, audio bookmarks for "capturing the moment" may be added or created with regard to an audio conversation, not only in real time during an ongoing audio conversation, or not necessarily in real time during an ongoing audio conversation. Rather, audio bookmarks for "capturing the moment" may be added or created in retrospect with regard to an already-finished already-recorded audio conversation, by a user that listens in retrospect to the audio recording of such conversation. For example, User Carla may user her end-user device to listen to a recorded audio conversation that took place between participants Adam and Bob; and during such playback, User Carla may utilize the "Capture the Moment" GUI element on her end-user device to create her own audio bookmarks for such audio recording; thereby generating for User Carla, who did not participate in that audio conversation, her own, private, Audio Bookmarks Log 126, which may be stored on her own end-user device and/or may be stored in the Recorded Conversations Repository 122 in relation to that particular audio conversation (e.g., in a manner that is not accessible to Adam or Bob, or to other users, without the specific approval of User Carla who created such private audio bookmarks). For example, some or all of the components and/or the functionalities that are described above, may be incorporated into a Playback Application 136, without requiring the bookmarking user to utilize an audio conferencing application.

In some embodiments, the audio bookmarking "capture the moment" functionalities may be incorporated into other types of applications or devices; for example, they may be part of a device or an application for dictating a lecture or for taping or recording a lecture or a speech, or they may be a "dicta-phone" application (or a "dicta-phone" device; or a device or application that records an audio conversation) that records audio spoken by one person or by several persons, or may be part of an audio recording device or application, or may be part of an audio transcribing device or application, or may be part of an Audio Recording Application 137 of other suitable type or purpose. For example, a user may record the audio of a face-to-face conversation between himself and one or more other persons (e.g., business meeting, personal meeting, job interview, personal interview, police investigation or law enforcement investigation, police interrogation or law enforcement interrogation, recording of a lecture or a speech given by a speaker or a professor or a teacher or a political speaker, or the like), and that person (e.g., which takes part actively in such audio conversation as an active participant and speaker, and/or which takes part passively in such audio conversation as a passive non-participating listener or as an audience member) may push or press or click on the "capture the moment" button or GUI element in order to create audio bookmarks at particular time-points during the ongoing audio conversation or discussion; for subsequent review and collection of those particular audio-segments.

In some embodiments, the Bookmarking Unit 126, and/or other components of the system, may optionally provide to a participant the ability to indicate, in real time while an audio conversation is ongoing, that an extension of a prolonging or a forward-stretching of a time-slot of an audio bookmark should be performed. For example, the Bookmarking Unit 126 may generated a first GUI element for creating a new audio bookmark; and a second GUI element for indicating a user request or a user suggestion for time extension of the time-slot that is associated with the most recently-indicated audio bookmark. User Adam is a participant in a conversation; at time-point 2:30 (two and a half minutes) User Adam clicks or presses or touches the "Create Audio Bookmark" button, since User Adam has just heard User Bob say a sentence of interest. Regularly, the system is configured, in general for all users, or (in some embodiments) for the audio bookmarks of User Adam, to associate each audio bookmark with a time-slot of length L (e.g., 30 seconds), which starts L1 seconds (e.g., 20 seconds) before the audio bookmark command was inputted, and which ends L2 seconds (e.g., 10 seconds) after the audio bookmark command was inputted. However, as User Bob continues to talk, the participant User Adam notices that the original utterance or sentence is continuing to be of interest, and that the time-slot that is associated with this particular bookmark should be extended or prolonged; for example, to include 60 seconds of time-length, instead of the regular 30 seconds. Accordingly, User Adam presses or clicks or touches or otherwise selects the GUI element of "Time Extension for Most-Recent Audio Bookmark", and this action indicates to the system that the length L of the time-slot of the most-recent audio bookmark should be extended; for example, by adding a pre-defined extension period (e.g., adding 20 seconds to the time slot, upon every additional press of that GUI element of "Time Extension for Most-Recent Audio Bookmark"), or by doubling the original time-length L (or by multiplying it by a pre-defined factor that is larger than one, such as 1.5 or 1.75); or by extending that time-slot to begin L1 seconds before the time-point of the audio bookmark, and to end L3 seconds (e.g., 12 seconds) after the pressing of the GUI element of "Time Extension for Most-Recent Audio Bookmark". This mechanism may enable a participant to signal to the system, that a particular audio bookmark should be associated with a time-slot that is greater or longer than the "default length" that is defined for audio bookmarks of that particular user, or that is defined for audio bookmarks of users in general.

In some embodiments, each participant may configure or modify the time-lengths of L and/or L1 and/or L2 and/or L3 that are associated with his own audio bookmarks. For example, the system may provide default values, such as, L=30 seconds, and L1=20 seconds, and L2=10 seconds, and L3=12 seconds; and those values apply to all users unless modified. User Adam may configure the system such that for his audio bookmarks, those parameters will have other values; in order to enable the system to capture for him longer or shorter time-slots of audio that are associated with each of his audio bookmarks.

In some embodiments, each audio-clip or audio-segment that the system generates (e.g., as a discrete audio portion) for each audio bookmark, and/or each transcript-portion that is associated with such audio-segment or which each audio bookmark, may be associated with one or more Attributes or Descriptors that may be set, stored, modified, and later searched and browsed by the user who created the audio bookmark(s). For example, each audio bookmark may be associated with a Name or Title attribute that may be provided or edited by the creator of the audio bookmark (e.g., a textual string of "Bob approved the budget"); with one or more Tags or Keywords (e.g., tag "Budget", tag "Approval"); and with identifiers of one or more speakers that have spoken during the time-slot associated with that audio bookmark, or who spoke exactly during the time-point in which the bookmarking user has pressed or clicked or touched the GUI element that provides the audio bookmark creation command, and optionally, the Speaker Recognition Unit 128 may autonomously and/or automatically recognize or detect or identify the relevant speaker(s) and may add their identity as a textual annotation that is associated with that audio bookmark as an attribute thereof. For example, in an audio conversation of users Adam, Bob and Carla, the user Adam creates an audio bookmark exactly when User Bob is speaking; the system recognizes automatically that User Bob was the speaker at that time-point in which User Adam commanded to create his audio bookmark; and therefore, the system automatically adds an Attribute or meta-data or descriptor, to that particular audio bookmark, to indicate that the Speaker in that moment was User Bob. The Bookmarking Unit 125 may perform these operation, of creating, modifying, managing, searching and/or browsing audio bookmarks based on (or in association with) Attributes; optionally utilizing an Audio Bookmark Attributes Management Unit, which may be part of the Bookmarking Unit 125 or may be associated with it. For example, user Adam may later search or browse his audio bookmark, within a particular audio conversation, or even across several or all of the audio conversations that are accessible to him, by requesting all the audio bookmarks in which the Speaker was User Bob; and the system may provide to User Adam those particular audio bookmarks, and their discrete audio clips and transcript-portion.

In some embodiments, the system may further generate, automatically, a "trailer" or an "audio trailer" or a summary of the audio bookmarks that a particular user had created for a particular audio conversation. For example, User Adam has participated in an audio conversation with User Bob and User Carla, which lasted 90 minutes. During that audio conversation, User Adam has created Six audio bookmarks. User Adam may then utilize a suitable GUI element to command the system to "generate an audio trailer" or "generate a summary of my audio bookmarks". In response to such command, the system generates Six audio-segments that correspond to those six audio bookmarks that User Adam created, each audio-segment having a time-length L (for example, 30 seconds), each audio-segment commencing L1 seconds before the time-point of the audio bookmark (e.g., 18 seconds before it), and ending L2 seconds after the time-point of the audio bookmark (e.g., 12 seconds after it); thereby generating a set of Six audio-clips, each clip being 30 seconds long; and then automatically merging or joining them or concatenating them to create an aggregated 3-minute (180 seconds) audio clip which is an "audio trailer" of that 90-minute audio conversation, reflecting the audio bookmarks that were of interest to User Adam. The generated "audio trailer" may be downloaded or saved by User Adam as an audio file, or may be shared or sent or posted; and may be accompanied by a textual transcript that corresponds to the speech portions that were said within those time-slots that are part of the "audio trailer", to thus provide a transcript version or a textual representation of that "audio trailer". It is noted that the system may thus generate, for the same audio conversation: for User Adam, a first "audio trailer" which includes 300 seconds of audio, corresponding to 6 audio bookmarks that User Adam created; and for User Carla, a second, different, "audio trailer" which includes 200 seconds of audio, corresponding to 4 audio bookmarks that User Carla created (for the same 90-minute audio conversation); thereby enabling each user or each participant to obtain a summary or an audio trailer that suits his particular portions-of-interest.

In some embodiments, each user or participant may configure the system to generate automatically an "audio trailer" that includes only some, but not all, of his own audio bookmarks; for example, based on an Attribute that he selects, or based on an identified speaker, or a tag, or other attribute. For example, even though User Adam has created Six audio bookmarks for the 90-minutes conversation, User Adam may request the system to generate an audio trailer that corresponds only to the audio bookmarks that have the word "Budget" in their Title (or, as a Tag or as an Annotation); and in response to such request or command, the system selects only some of the six audio bookmarks for which this criterion holds true, and generates the audio trailer only for those particular audio bookmarks. In another example, even though User Adam has created Six audio bookmarks for the 90-minutes conversation, User Adam may request the system to generate an audio trailer that corresponds only to the audio bookmarks in which User Carla was the automatically-detected Speaker; and in response to such request or command, the system selects only some of the six audio bookmarks for which this criterion holds true, and generates the audio trailer only for those particular audio bookmarks.

The system may therefore enable each user to create his own audio bookmark(s), for the same audio conversation, reflecting highlights or points-of-interests of content-of-interest for that particular user. When several such audio bookmarks or highlights are created (or even when only one such audio bookmark or highlight is created), the system may generate audio clips that correspond to time-slots that include the time-points of those audio bookmarks (for example, each time slot including T1 seconds before the time-point and including T2 seconds after the time-point); and an aggregation or a sequence of those audio clips may be generated, stored, saved, shared, and/or played as audio; thereby generating and playing a virtual summary or a user-specific audio summary of a meeting based on the points-of-interest that the specific user had marked; and optionally including the audio captured in those time-slots (user-specific audio summary) and/or the text of words or speech that were spoken in those time-slots (user-specific textual summary); thus creating a user-specific or personal or private summary of the audio conversation, which includes only the portions that were portions-of-interest to this specific user. The method may thus comprise, for example: generating from said audio conversation, a user-specific audio summary which corresponds to audio captured at time-slots that correspond to the audio bookmarks created by said user, and further generating a user-specific textual summary which corresponds to text of the audio that was captured in said time-slots; wherein a different user-specific audio summary, and a different user-specific textual summary, are generated and then played or displayed separately to each user based on the audio bookmarks that said user created.

Some embodiments may include a method (or a computerized method, or a computerized process) comprising: (a) during an ongoing audio conversation, receiving from an electronic device of a participant, a tactile input via a touch-screen of the electronic device or via a physical input unit of the electronic device, of an audio bookmarking command that indicates a request of said participant to create an audio bookmark, wherein step (a) is performed in real time while recording said audio conversation; (b) determining a time-point within said audio conversation, at which said user-input was received; (c) automatically generating for said participant a user-specific set of audio bookmarks for a recorded version of said audio conversation. Each audio bookmark in the set of audio bookmarks, points at a particular time-point within the recorded version of said audio conversation in which said participant provided an audio bookmarking command.

In some embodiments, the method comprises: receiving from said participant, at a first time-point T1 within said ongoing audio conversation, a first audio bookmarking command; receiving from said participant, at a second time-point T2 within said ongoing audio conversation, a second audio bookmarking command; automatically generating a set of audio bookmarks, which comprises: (i) a first audio bookmark that points to the first time-point T1 in the recorded version of said audio conversation, and (ii) a second audio bookmark that points to the second time-point T2 in the recorded version of said audio conversation.

In some embodiments, the method comprises: generating, for a first participant in said audio conversation, a first set of audio bookmarks that correspond to audio time-points that said first participant commanded to bookmark; generating separately, for a second participant in said audio conversation, a second and separate set of audio bookmarks that correspond to audio time-points that said second participant commanded to bookmark.

In some embodiments, the method comprises: wherein each of the first set and the second set is a private set of audio bookmarks; wherein the method comprises: authorizing only the first participant to access the first set of audio bookmarks; authorizing only the second participant to access the second set of audio bookmarks.

In some embodiments, the method comprises: (d) for a set of audio bookmarks having N audio bookmarks of said participant, automatically generating a set of N separate audio-clips; wherein each generated audio-clip includes a time-constrained portion of the recorded version of said audio conversation that includes audio that was captured surrounding a time-point of a single audio bookmark.

In some embodiments, the method comprises: (d) for a set of audio bookmarks having N audio bookmarks of said participant, automatically generating a set of N separate audio-clips; wherein each generated audio-clip includes a time-constrained portion of the recorded version of said audio conversation that includes audio that was captured surrounding a time-point of a single audio bookmark, wherein said time-constrained portion of the recorded audio version includes recorded audio that was recorded P1 seconds immediately before the time-point and P2 seconds immediately after the time-point, wherein P1 and P2 are pre-defined values.

In some embodiments, the method comprises: (e) based on a textual input received from said participant, assigning a particular name or a particular tag to a particular audio-clip of said N separate automatically-generated audio-clips.

In some embodiments, the method comprises: performing a search for audio-clips that are associated with a particular name or tag.

In some embodiments, the method comprises: for each audio bookmark created by said participant, applying a Speaker Identification process that identifies a speaker at a time-point that was audio bookmarked; and extracting from the recorded version of the conversation, an audio segment that surrounds said time-point and that includes a speech-segment made by said speaker around said time-point.

In some embodiments, the method comprises: for each audio bookmark created by said participant, applying a Speaker Identification process that identifies a speaker at a time-point that was audio bookmarked; and extracting from the recorded version of the conversation, an audio segment that surrounds said time-point and that includes only a speech-segment made by said speaker around said time-point and that excludes speech by any other participants.

In some embodiments, the method comprises: automatically generating a textual transcript of said audio conversation, by utilizing a speech-to-text transcription process; for each audio bookmark created by said participant, extracting from said textual transcript, a transcript portion that corresponds to a pre-defined time-slot that surrounds the time-point of the audio bookmark; and providing said transcript portion for copying or sharing.

In some embodiments, the method comprises: automatically generating a textual transcript of said audio conversation, by utilizing a speech-to-text transcription process; for each audio bookmark created by said participant, extracting from said textual transcript, a transcript portion that corresponds to a pre-defined time-slot that surrounds the time-point of the audio bookmark;

generating a collection of all the transcript portions, that correspond to speech segments that were said during a time-slot that surrounds the time-point of each audio bookmark.

In some embodiments, the method comprises: associating between (I) each audio bookmark created by said participant, and (II) one or more attributes that are set by said participant; wherein said one or more attributes comprise at least one of: a title, a name, an annotation, a textual descriptor, a speaker name, a topic, a tag; enabling said participant to search or to browse audio bookmarks, based on one or more attributes.

In some embodiments, the method comprises: associating between (I) each audio bookmark created by said participant, and (II) a descriptor of a speaker who spoke during the time-slot of said audio bookmark and that was recognized automatically by a speaker recognition unit; enabling said participant to search or to browse audio bookmarks based on a speaker descriptor.

In some embodiments, the method comprises: automatically generating for said participant an audio trailer of said audio conversation, by aggregating audio-segments of the audio-conversation, each audio-segment corresponding to a time-slot of the audio conversation that surrounds the time-point of the audio bookmark; wherein the audio trailer is provided to said participant as at least one of: (i) an audio clip for downloading or sharing, (ii) a textual transcript.

In some embodiments, the method comprises: automatically generating for said participant, a selective audio trailer of said audio conversation that is based on a particular speaker, by aggregating audio-segments of the audio-conversation in which a speaker recognition unit had recognized said particular speaker; each audio-segment corresponding to a time-slot of the audio conversation that surrounds the time-point of the audio bookmark; wherein the selective audio trailer is provided to said participant as at least one of: (i) an audio clip for downloading or sharing, (ii) a textual transcript.

In some embodiments, the method comprises: receiving from said participant, while said audio conversation is ongoing, an extension command to extend a time-slot that will be associated with a recently-commanded audio bookmark; in response to said extension command, extending a time-length of the time-slot that is associated with the recently-commanded audio bookmark.

In some embodiments, the method comprises: generating from said audio conversation, a user-specific audio summary which corresponds to audio captured at time-slots that correspond to the audio bookmarks created by said user, and further generating a user-specific textual summary which corresponds to text of the audio that was captured in said time-slots; wherein a different user-specific audio summary, and a different user-specific textual summary, are generated and then played or displayed separately to each user based on the audio bookmarks that said user created.

Some embodiments may include a non-transitory storage medium having stored thereon instructions that, when executed by one or more processors, cause the one or more processors to perform a method as described above.

Some embodiments may include a system comprising: one or more processors, operably associated with one or more memory units; wherein the one or more processors are configured: (a) during an ongoing audio conversation, to receive from an electronic device of a participant, a tactile input via a touch-screen of the electronic device or via a physical input unit of the electronic device, of an audio bookmarking command that indicates a request of said participant to create an audio bookmark, wherein (a) is performed in real time while recording said audio conversation; (b) to determine a time-point within said audio conversation, at which said user-input was received; (c) to automatically generate for said participant a user-specific set of audio bookmarks for a recorded version of said audio conversation; wherein each audio bookmark in the set of audio bookmarks, points at a particular time-point within the recorded version of said audio conversation in which said participant provided an audio bookmarking command.

In accordance with the present invention, each one of the devices or units of system 100 may be implemented by using (or may comprise) one or more hardware units and/or software units, processors, CPUs, DSPs, integrated circuits, memory units, storage units, wireless communication modems or transmitters or receivers or transceivers, cellular transceivers, a power source, input units, output units, Operating System (OS), drivers, applications, and/or other suitable components.

Some embodiments comprise a non-transitory storage medium or storage article having stored thereon instructions that, when executed by a hardware processor, cause the hardware processor to perform a method as described above and/or herein.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The present invention may be implemented by using hardware units, software units, processors, CPUs, DSPs, integrated circuits, memory units, storage units, wireless communication modems or transmitters or receivers or transceivers, cellular transceivers, a power source, input units, output units, Operating System (OS), drivers, applications, and/or other suitable components.

The present invention may be implemented by using a special-purpose machine or a specific-purpose that is not a generic computer, or by using a non-generic computer or a non-general computer or machine. Such system or device may utilize or may comprise one or more units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

The present invention may be implemented by using code or program code or machine-readable instructions or machine-readable code, which is stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such device to perform a method in accordance with the present invention.

Embodiments of the present invention may be utilized with a variety of devices or systems having a touch-screen or a touch-sensitive surface; for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, a "kiosk" type device, a vending machine, an Automatic Teller Machine (ATM), a laptop computer, a desktop computer, a vehicular computer, a vehicular dashboard, a vehicular touch-screen, or the like.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL), BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a list of reference value(s) or a database of reference values or ranges; a comparison or matching or searching process which searches for matches and/or identical results and/or similar results and/or sufficiently-close results, among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Repeated use of the phrase "in one embodiment" does not necessarily refer to the same embodiment, although it may. Repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may comprise, or may be implemented by using, an "app" or application which may be downloaded or obtained from an "app store" or "applications store", for free or for a fee, or which may be pre-installed on a computing device or electronic device, or which may be transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A method comprising:
(a) during an ongoing audio conversation, receiving from an electronic device of a participant, a tactile input via a touch-screen of the electronic device or via a physical input unit of the electronic device, of an audio bookmarking command that indicates a request of said participant to create an audio bookmark,
wherein step (a) is performed in real time while recording said audio conversation;
(b) determining a time-point within said audio conversation, at which said tactile input was received;
(c) automatically generating for said participant a user-specific set of audio bookmarks for a recorded version of said audio conversation,
wherein each audio bookmark in the set of audio bookmarks, points at a particular time-point within the recorded version of said audio conversation in which said participant provided an audio bookmarking command;
wherein the method further comprises:
associating between (I) each audio bookmark created by said participant, and (II) a descriptor of a speaker who spoke during a time-slot of said audio bookmark and that was recognized automatically by a speaker recognition unit;
enabling said participant to search or to browse audio bookmarks based on a speaker descriptor.

2. The method of claim 1, wherein the method comprises:
receiving from said participant, at a first time-point T1 within said ongoing audio conversation, a first audio bookmarking command;
receiving from said participant, at a second time-point T2 within said ongoing audio conversation, a second audio bookmarking command;
automatically generating a set of audio bookmarks, which comprises: (i) a first audio bookmark that points to the first time-point T1 in the recorded version of said audio conversation, and (ii) a second audio bookmark that points to the second time-point T2 in the recorded version of said audio conversation.

3. The method of claim 2, further comprising:
generating, for a first participant in said audio conversation, a first set of audio bookmarks that correspond to audio time-points that said first participant commanded to bookmark;
generating separately, for a second participant in said audio conversation, a second and separate set of audio bookmarks that correspond to audio time-points that said second participant commanded to bookmark.

4. The method of claim 3,
wherein each of the first set and the second set is a private set of audio bookmarks,
wherein the method comprises:
authorizing only the first participant to access the first set of audio bookmarks;
authorizing only the second participant to access the second set of audio bookmarks.

5. The method of claim 1, further comprising:
(d) for a set of audio bookmarks having N audio bookmarks of said participant,
automatically generating a set of N separate audio-clips,
wherein each generated audio-clip includes a time-constrained portion of the recorded version of said audio conversation that includes audio that was captured surrounding a time-point of a single audio bookmark, wherein said time-constrained portion of the recorded audio version includes recorded audio that was recorded P1 seconds immediately before the time-point and P2 seconds immediately after the time-point, wherein P1 and P2 are pre-defined values.

6. The method of claim 1, further comprising:
for each audio bookmark created by said participant,
applying a Speaker Identification process that identifies a speaker at a time-point that was audio bookmarked; and extracting from the recorded version of the conversation, an audio segment that surrounds said time-point and that includes a speech-segment made by said speaker around said time-point.

7. The method of claim 1, further comprising:
for each audio bookmark created by said participant,
applying a Speaker Identification process that identifies a speaker at a time-point that was audio bookmarked; and extracting from the recorded version of the conversation, an audio segment that surrounds said time-point and that includes only a speech-segment made by said speaker around said time-point and that excludes speech by any other participants.

8. The method of claim 1, further comprising:
automatically generating a textual transcript of said audio conversation, by utilizing a speech-to-text transcription process;
for each audio bookmark created by said participant,
extracting from said textual transcript, a transcript portion that corresponds to a pre-defined time-slot that surrounds the time-point of the audio bookmark; and providing said transcript portion for copying or sharing.

9. The method of claim 1, further comprising:
automatically generating a textual transcript of said audio conversation, by utilizing a speech-to-text transcription process;
for each audio bookmark created by said participant,
extracting from said textual transcript, a transcript portion that corresponds to a pre-defined time-slot that surrounds the time-point of the audio bookmark;

generating a collection of all the transcript portions, that correspond to speech segments that were said during a time-slot that surrounds the time-point of each audio bookmark.

10. The method of claim 1, further comprising:
associating between (I) each audio bookmark created by said participant, and (II) one or more attributes that are set by said participant; wherein said one or more attributes comprise at least one of: a title, a name, an annotation, a textual descriptor, a speaker name, a topic, a tag;
enabling said participant to search or to browse audio bookmarks, based on one or more attributes.

11. A method comprising:
(a) during an ongoing audio conversation, receiving from an electronic device of a participant, a tactile input via a touch-screen of the electronic device or via a physical input unit of the electronic device, of an audio bookmarking command that indicates a request of said participant to create an audio bookmark,
wherein step (a) is performed in real time while recording said audio conversation;
(b) determining a time-point within said audio conversation, at which said tactile input was received;
(c) automatically generating for said participant a user-specific set of audio bookmarks for a recorded version of said audio conversation,
wherein each audio bookmark in the set of audio bookmarks, points at a particular time-point within the recorded version of said audio conversation in which said participant provided an audio bookmarking command;
(d) for a set of audio bookmarks having N audio bookmarks of said participant,
automatically generating a set of N separate audio-clips,
wherein each generated audio-clip includes a time-constrained portion of the recorded version of said audio conversation that includes audio that was captured surrounding a time-point of a single audio bookmark;
(e) based on a textual input received from said participant, assigning a particular name or a particular tag to a particular audio-clip of said N separate automatically-generated audio-clips.

12. The method of claim 11, further comprising:
performing a search for audio-clips that are associated with a particular name or tag.

13. A method comprising:
(a) during an ongoing audio conversation, receiving from an electronic device of a participant, a tactile input via a touch-screen of the electronic device or via a physical input unit of the electronic device, of an audio bookmarking command that indicates a request of said participant to create an audio bookmark,
wherein step (a) is performed in real time while recording said audio conversation;
(b) determining a time-point within said audio conversation, at which said tactile input was received;
(c) automatically generating for said participant a user-specific set of audio bookmarks for a recorded version of said audio conversation,
wherein each audio bookmark in the set of audio bookmarks, points at a particular time-point within the recorded version of said audio conversation in which said participant provided an audio bookmarking command;
wherein the method further comprises:
automatically generating for said participant an audio trailer of said audio conversation, by aggregating audio-segments of the audio-conversation, each audio-segment corresponding to a time-slot of the audio conversation that surrounds the time-point of the audio bookmark;
wherein the audio trailer is provided to said participant as at least one of: (i) an audio clip for downloading or sharing, (ii) a textual transcript.

14. A method comprising:
(a) during an ongoing audio conversation, receiving from an electronic device of a participant, a tactile input via a touch-screen of the electronic device or via a physical input unit of the electronic device, of an audio bookmarking command that indicates a request of said participant to create an audio bookmark,
wherein step (a) is performed in real time while recording said audio conversation;
(b) determining a time-point within said audio conversation, at which said tactile input was received;
(c) automatically generating for said participant a user-specific set of audio bookmarks for a recorded version of said audio conversation,
wherein each audio bookmark in the set of audio bookmarks, points at a particular time-point within the recorded version of said audio conversation in which said participant provided an audio bookmarking command;
wherein the method further comprises:
automatically generating for said participant, a selective audio trailer of said audio conversation that is based on a particular speaker,
by aggregating audio-segments of the audio-conversation in which a speaker recognition unit had recognized said particular speaker,
each audio-segment corresponding to a time-slot of the audio conversation that surrounds the time-point of the audio bookmark;
wherein the selective audio trailer is provided to said participant as at least one of: (i) an audio clip for downloading or sharing, (ii) a textual transcript.

15. A method comprising:
(a) during an ongoing audio conversation, receiving from an electronic device of a participant, a tactile input via a touch-screen of the electronic device or via a physical input unit of the electronic device, of an audio bookmarking command that indicates a request of said participant to create an audio bookmark,
wherein step (a) is performed in real time while recording said audio conversation;
(b) determining a time-point within said audio conversation, at which said tactile input was received;
(c) automatically generating for said participant a user-specific set of audio bookmarks for a recorded version of said audio conversation,
wherein each audio bookmark in the set of audio bookmarks, points at a particular time-point within the recorded version of said audio conversation in which said participant provided an audio bookmarking command;
wherein the method further comprises:
receiving from said participant, while said audio conversation is ongoing, an extension command to extend a time-slot that will be associated with a recently-commanded audio bookmark;

in response to said extension command, extending a time-length of the time-slot that is associated with the recently-commanded audio bookmark.

16. The A method of claim 1, further comprising:
(a) during an ongoing audio conversation, receiving from an electronic device of a participant, a tactile input via a touch-screen of the electronic device or via a physical input unit of the electronic device, of an audio bookmarking command that indicates a request of said participant to create an audio bookmark,
wherein step (a) is performed in real time while recording said audio conversation;
(b) determining a time-point within said audio conversation, at which said tactile input was received;
(c) automatically generating for said participant a user-specific set of audio bookmarks for a recorded version of said audio conversation, wherein each audio bookmark in the set of audio bookmarks, points at a particular time-point within the recorded version of said audio conversation in which said participant provided an audio bookmarking command;

wherein the method further comprises:

generating from said audio conversation, a user-specific audio summary which corresponds to audio captured at time-slots that correspond to the audio bookmarks created by said user, and further generating a user-specific textual summary which corresponds to text of the audio that was captured in said time-slots;

wherein a different user-specific audio summary, and a different user-specific textual summary, are generated and then played or displayed separately to each user based on the audio bookmarks that said user created.

* * * * *